US009273398B2

(12) United States Patent
Gallaway et al.

(10) Patent No.: US 9,273,398 B2
(45) Date of Patent: Mar. 1, 2016

(54) METALLIZED NANOTUBES

(75) Inventors: Clayton Gallaway, Houston, TX (US);
Dean Hulsey, Houston, TX (US);
Michael Searfass, Tomball, TX (US);
Joshua Falkner, Richmond, TX (US)

(73) Assignee: Nanoridge Materials, Inc., Houston, TX (US)

( * ) Notice: Subject to any disclaimer, the term of this patent is extended or adjusted under 35 U.S.C. 154(b) by 1520 days.

(21) Appl. No.: 12/657,288

(22) Filed: Jan. 16, 2010

(65) Prior Publication Data

US 2011/0174701 A1 Jul. 21, 2011

(51) Int. Cl.
B07C 5/36 (2006.01)
C23C 18/14 (2006.01)
B82Y 30/00 (2011.01)
B82Y 40/00 (2011.01)
C01B 31/02 (2006.01)
C01B 31/04 (2006.01)

(52) U.S. Cl.
CPC ............... *C23C 18/14* (2013.01); *B82Y 30/00* (2013.01); *B82Y 40/00* (2013.01); *C01B 31/0206* (2013.01); *C01B 31/0253* (2013.01); *C01B 31/0266* (2013.01); *C01B 31/0484* (2013.01); *C01B 2202/02* (2013.01); *C01B 2202/04* (2013.01); *C01B 2202/06* (2013.01); *Y10T 428/2991* (2015.01)

(58) Field of Classification Search
CPC ............ C01B 31/0206; C01B 31/0253; C01B 31/0266; B03B 7/00; C23C 18/14
USPC ........... 209/606; 427/305, 212, 217, 595, 597
See application file for complete search history.

(56) References Cited

U.S. PATENT DOCUMENTS

| 5,648,201 | A | * | 7/1997 | Dulcey et al. | 430/324 |
| 5,776,555 | A | * | 7/1998 | Wagland et al. | 427/487 |
| 6,250,984 | B1 | | 6/2001 | Jin et al. | 445/51 |
| 6,420,293 | B1 | | 7/2002 | Chang et al. | 501/95.2 |
| 6,762,237 | B2 | | 7/2004 | Glatkowski et al. | 524/496 |
| 6,858,173 | B2 | | 2/2005 | Zhan et al. | 264/430 |
| 7,014,737 | B2 | | 3/2006 | Harutyunyan et al. | 204/158.2 |
| 7,074,310 | B2 | | 7/2006 | Smalley et al. | 204/450 |
| 7,442,414 | B2 | | 10/2008 | Ren et al. | 427/249.1 |
| 7,743,835 | B2 | | 6/2010 | Willauer | 166/387 |
| 7,815,806 | B2 | | 10/2010 | Cooper et al. | 210/660 |
| 7,829,622 | B2 | | 11/2010 | McDaniel et al. | 524/496 |

(Continued)

FOREIGN PATENT DOCUMENTS

WO   WO 2008/140623   12/2007   .............. H01L 29/40

OTHER PUBLICATIONS

U.S. Appl. No. 12/657,244, filed Jan. 16, 2010, now pending and co-owned with the present application.

(Continued)

*Primary Examiner* — Joseph C Rodriguez
*Assistant Examiner* — Kalyanavenkateshware Kumar
(74) *Attorney, Agent, or Firm* — Guy McClung

(57) ABSTRACT

A process for metallizing nanomaterial including subjecting nanomaterial in a metallizing solution to microwave radiation; nanomaterial made by such a process; and density gradient separation of such material. This abstract is provided to comply with the rules requiring an abstract which will allow a searcher or other reader to quickly ascertain the subject matter of the technical disclosure and is submitted with the understanding that it will not be used to interpret or limit the scope or meaning of the claims, 37 C.F.R. 1.72(b).

18 Claims, 11 Drawing Sheets

(56) References Cited

U.S. PATENT DOCUMENTS

| | | | |
|---|---|---|---|
| 7,834,139 B2 | 11/2010 | Matsui et al. | 530/300 |
| 7,837,905 B2 | 11/2010 | Barker et al. | 264/29.2 |
| 7,838,459 B2 | 11/2010 | Nagy et al. | 502/300 |
| 7,838,587 B2 | 11/2010 | El Bounia et al. | 524/495 |
| 7,871,533 B1 | 1/2011 | Haiping et al. | 252/70 |
| 8,038,479 B2 | 10/2011 | Searfass | 439/658 |
| 8,080,487 B2 | 12/2011 | Gardner et al. | 442/189 |
| 8,084,012 B2 | 12/2011 | Afzali-Adrakami et al. | 423/460 |
| 8,084,101 B2 | 12/2011 | Das | 427/474 |
| 8,096,353 B2 | 1/2012 | Ver Meer | 166/244.1 |
| 8,105,964 B2 | 1/2012 | Cawse et al. | 442/189 |
| 2003/0039750 A1* | 2/2003 | Mao et al. | 427/180 |
| 2004/0018371 A1 | 1/2004 | Mao | 428/545 |
| 2005/0220988 A1 | 10/2005 | Dodelet et al. | 427/113 |
| 2006/0135030 A1 | 6/2006 | Mao | 445/50 |
| 2007/0148457 A1* | 6/2007 | Wagner et al. | 428/402 |
| 2007/0161213 A1* | 7/2007 | Hiura et al. | 438/478 |
| 2008/0170982 A1 | 7/2008 | Zhang et al. | 423/447.3 |
| 2009/0110644 A1 | 4/2009 | Margel et al. | 424/9.322 |
| 2009/0317660 A1 | 12/2009 | Heintz et al. | 428/688 |
| 2010/0051879 A1 | 3/2010 | Sainsbury et al. | 252/500 |
| 2010/0283033 A1* | 11/2010 | Tsakalakos et al. | 257/10 |
| 2010/0288980 A1 | 11/2010 | Ittel | 252/503 |
| 2010/0300759 A1 | 12/2010 | Passade-Boupat et al. | 175/65 |
| 2010/0320439 A1 | 12/2010 | Jin et al. | 257/10 |
| 2010/0326813 A1 | 12/2010 | Mitra et al. | 204/157.43 |
| 2010/0326834 A1 | 12/2010 | Reynolds et al. | 205/50 |
| 2012/0024109 A1 | 2/2012 | Xu et al. | 75/243 |
| 2012/0027934 A1 | 2/2012 | Lee et al. | 427/217 |

OTHER PUBLICATIONS

U.S. Appl. No. 12/657,289, filed Jan. 16, 2010, now pending and co0owned with the present application.

Pending U.S. Appl. No. 12/657,244, filed Jan. 16, 2010.

Pending U.S. Appl. No. 12/657,289, filed Jan. 16, 2010.

Carbon nanotube composite curing through absorption of microwave radiation, Higginbotham et al, Composite Science and Technology 68 (2008) pp. 3087-3092.

Instantaneous electrodeposition of Metal nanostructures on mass Carbon nanotubes, Wei et al, *SAMPE Fall Technical Conference & Exhibiting 300 ct 2007*, 8 pp.

Carbon nanotube reinforced ceramic Matrix Composites—A Review, Samal et al, Journal of Minerals & Materials Characterization & Engineering, vol. 7, No. 4, pp. 355-370 (2008).

Microwave-Induced Multiple Functionalization of Carbon nanotubes, Brunnetti et al, Journal of the American Chemical Society, 2008, 130 (25); May 31, 2008, Abstract, 1 page.

Functionalization of carbon nanotubes by an effective intermittent microwave heating-assisted HF/H202 treatment for electrocatalyst support of fuel cells, Yin et al, Electrochimica Acta, vol. 54, issue 27, Nov. 30, 2009, Abstract, 1 page.

Electrodeposition of noble Metal Nanoparticles on Carbon nanotubes, Quinn et al, Journal of the American Chemical Society, 2005, 127 (17), Abstract, 1 p.

Pending U.S. Appl. No. 12/924,729, filed Oct. 4, 2010, naming Kissel et al as applicants.

\* cited by examiner

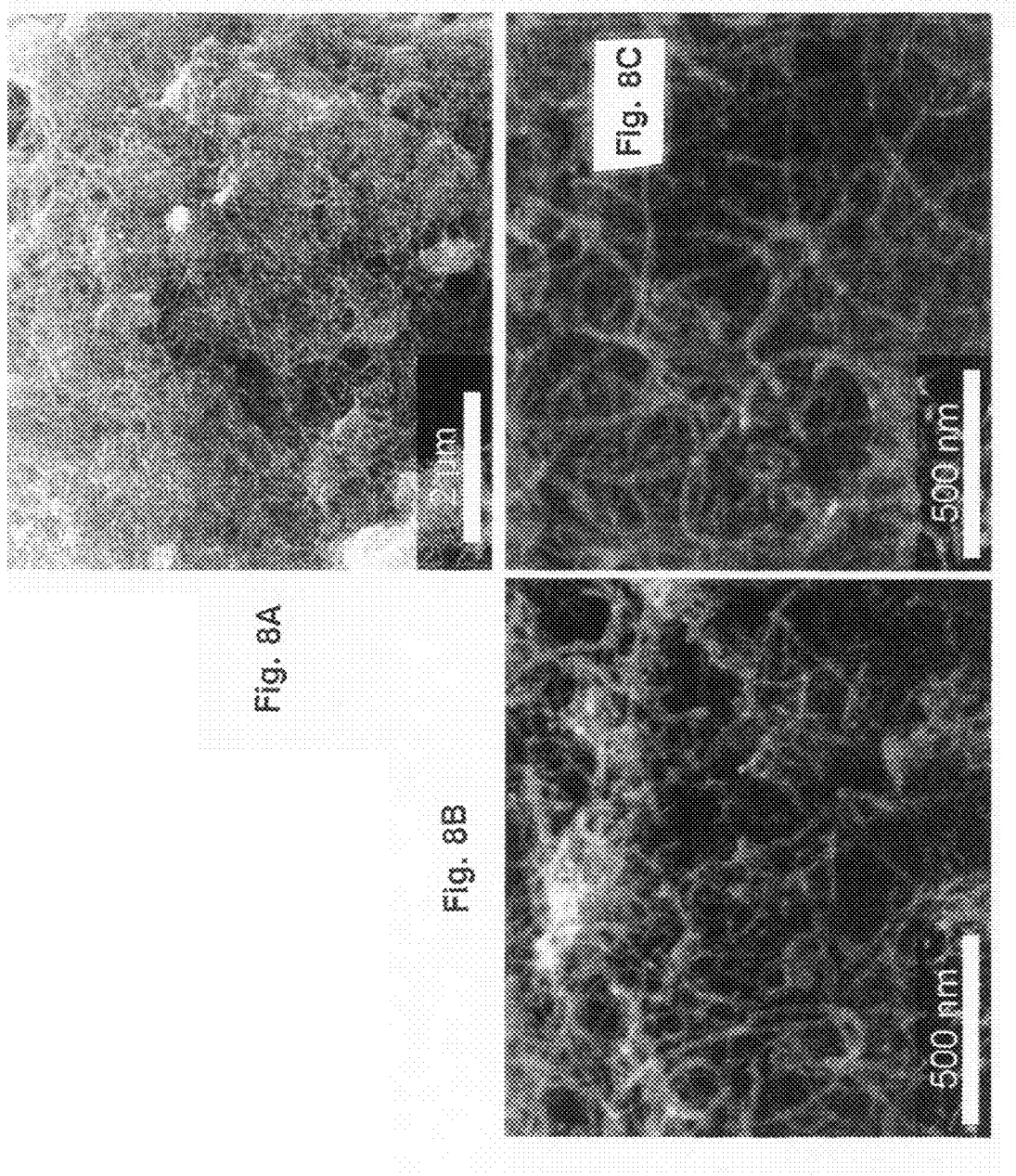

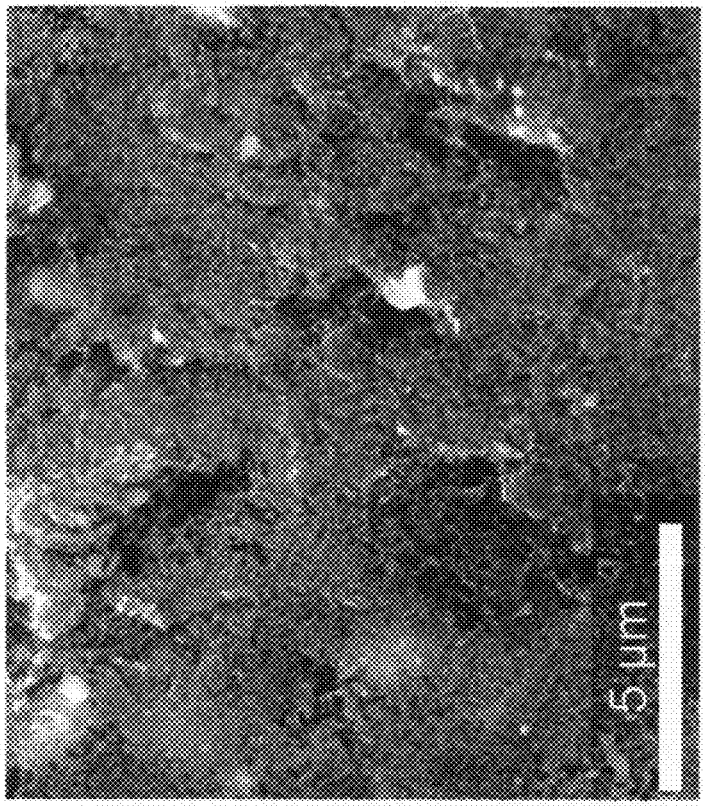
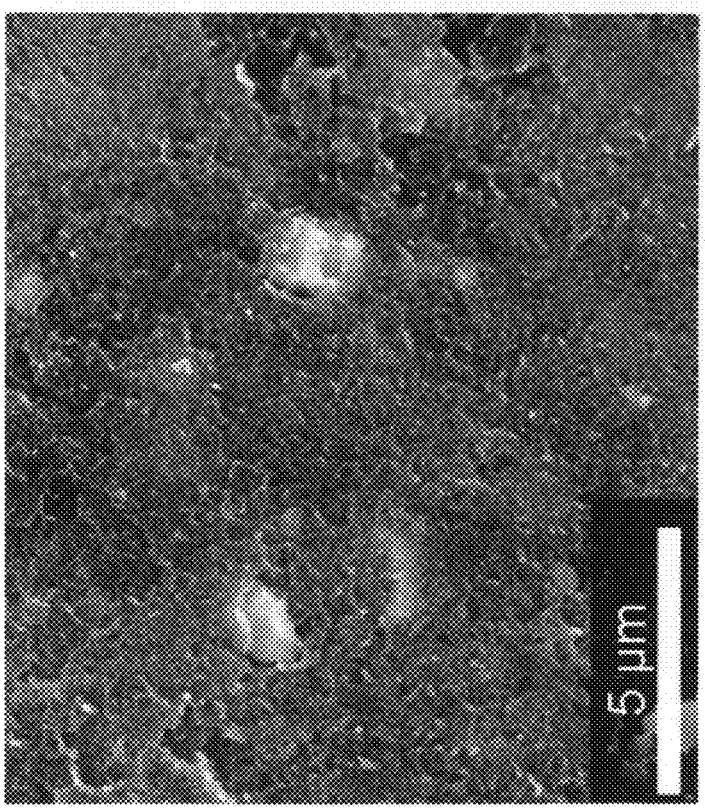
Fig. 10A
Fig. 10B
Fig. 10C
EDS results for Cu-MWNT's produced by microwave metallization process.

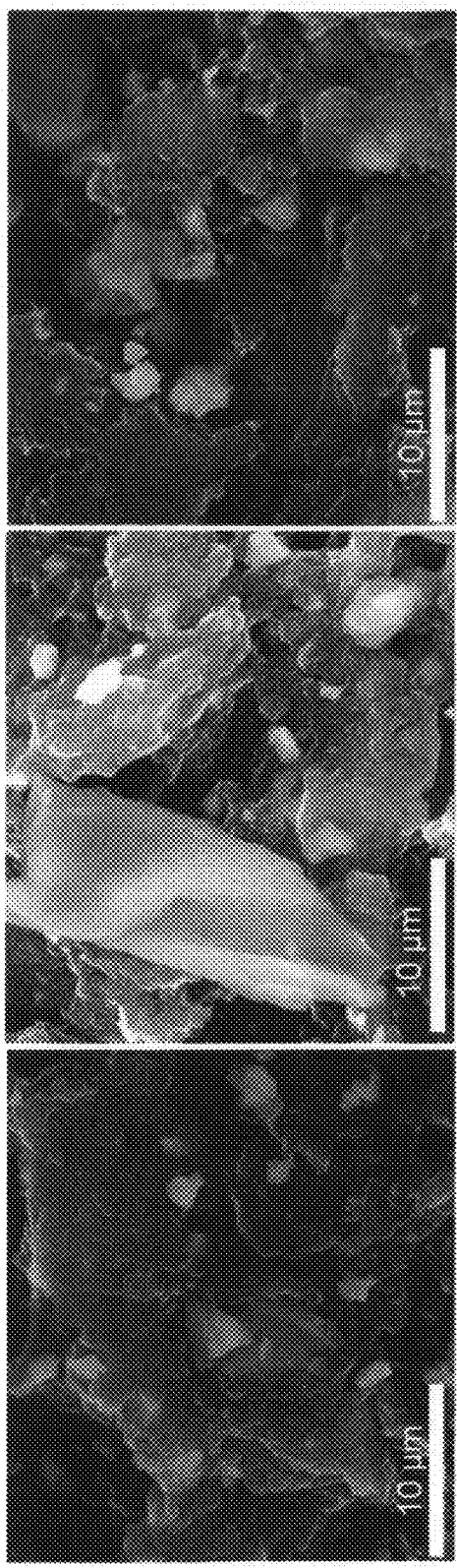

Agglomerated Co-MWNT's produced by microwave metallization process. EDS indicates the presence of deposited Co.

| Element | Wt % | At % | Wt % | At % | Wt % | At % |
|---|---|---|---|---|---|---|
| Co | 8.9% | 2.0% | 8.6% | 1.9% | 8.9% | 2.0% |
| C | 81.7% | 90.3% | 80.7% | 89.3% | 81.6% | 90.3% |
| O | 9.2% | 7.6% | 10.3% | 8.5% | 9.0% | 7.5% |
| S | 0.3% | 0.1% | 0.4% | 0.2% | 0.4% | 0.2% |

Electrical Resistivity of Ni-MWNT in Cured Polyurethane-methacrylate
Ni-MWNT's Contain 16 Wt. % Deposited Ni Metal.

| Ni-MWNT Concentration in Polyurethane-methacrylate (Wt. %, Carbon Basis) | Resistivity Mean ($\Omega \cdot cm$) | Resistivity St. Dev. (+/- $\Omega \cdot cm$) | No. of Samples |
|---|---|---|---|
| 0.0 | 2.75E+09 | --- | 1 |
| 0.1 | 3.89E+04 | 2.61E+04 | 3 |
| 1.4 | 6.51E+01 | 3.33E+01 | 2 |
| 3.0 | 2.88E+01 | 4.92E+00 | 3 |
| 100.0 | 2.47E-01 | --- | 1 |

Fig. 13

METALLIZED NANOTUBES

BACKGROUND OF THE INVENTION

1. Field of the Invention

The present invention is directed to: nanomaterials; to nanotubes; to nanoribbons; to metallized nanomaterials; in one particular aspect, to metallized carbon nanotubes; and to methods for metallizing nanomaterials, e.g. nanotubes, graphene sheets, and graphene ribbon-like material.

2. Description of Related Art

A wide variety of nanomaterials are known, e.g. nanotubes and nanoribbons. Carbon nanotubes (CNTs) have attracted much attention because of their extraordinary mechanical properties and unique electronic properties. A CNT is topologically equivalent to a two-dimensional graphene sheet rolled into a cylinder, with a cylinder diameter as small as 0.7 nanometers (nm) (and as large as several tens of nanometers) and with a cylinder length up to several microns ($\mu$m). A CNT can be single walled (SWNT) or multiple walled (MWNT) and can also be fabricated as a fiber or other structure. A CNT can be characterized by its chiral vector components (n, m), which help define tube diameter, electronic properties and other properties. Depending upon the chirality, a SWNT can be conducting (metal-like) or semiconducting.

Currently, attempts are ongoing to utilize CNT's to enhance the properties of a variety of polymers and composites. Significant mechanical, electrical, and thermal property improvements have been reported. However, in certain cases, there are significant processing obstacles that prevent full enhancement of polymers and composites using incorporated nanotubes. In certain methods, dispersion has been shown to be essential for property enhancement when nanotubes are blended with polymers. Due to the intrinsic van der Waals attraction the nanotubes have to each other, and by virtue of their high aspect ratio (e.g., about 1:1000), nanotubes are typically agglomerated along their lengths, e.g. together as bundles and ropes, that have very low solubility in most solvents. In many instances, despite processing to achieve individual particles, nanotubes tend to remain as entangled agglomerates and homogeneous dispersion is not easily obtained. Furthermore, due to the atomically smooth non-reactive surface of nanotubes, lack of interfacial bonding limits load transfer from the matrix to nanotubes. In this situation, nanotubes are often pulled from a matrix, rather than fractured, and play a limited role in mechanical reinforcement of a composite structure.

The potential for certain uses of nanotubes in these applications has, heretofore, not been realized because of difficulties in processing and limited CNT-to-matrix load transfer. Existing methods for overcoming these difficulties include chemical functionalization (addition of one or more specified chemical groups to a basic structure) and metallization (deposition of metal nanoparticles) on the CNT's. Development of enhanced polymers and composites may require functionalization of a collection of CNTs to allow the tubes to be dispersed more easily in a host polymer.

Certain current known CNT chemical functionalization processes require complex apparatus and processing, use wet chemical procedures, and involve liquids or vapors, to which the CNTs are exposed. An example is the use of hot flowing fluorine gas to bond fluorine atoms to CNTs, as reported by E. T. Michelson et al in Chem. Phys. Lett. vol 296 (1998) 188. Large quantities of chemical reactants and solvents are often required, with most of the chemicals becoming residues that must be disposed under hazardous substance guidelines. Recycling of the chemicals used is seldom an option.

Current processes for functionalization of CNT's by metallization include a physi-sorption technique that involves the separate preparation of metal nanoparticles involving a long sonication process to mix them with the carbon nanotubes, where dislodging of the metal particulates is often observed due to their loose attachment. Electroless deposition requires a harsh oxidative pretreatment (of the CNT's) followed by a complex activation-sensitization procedure, which is disruptive to the intrinsic CNT structure and properties.

Electrochemical deposition is challenging because of the need to establish reliable electrical contact with bulk CNT substrates. Current approaches to overcoming this challenge include CNT growth on a conducting template, microlithography, electrophoresis, sputtering and thermal evaporation, all of which involve complex apparatus and processing and are not amenable to scale-up for industrial manufacturing.

Known methods for metallizing nanotubes include, but are not limited to, those disclosed in U.S. patent applications Ser. No. 11/021,129 filed Dec. 22, 2004; Ser. No. 10/372,006 filed Feb. 21, 2003; Ser. No. 10/813,697 filed Mar. 31, 2004 and Ser. No. 12/232,818 filed Sep. 24, 2008; and in PCT Application Int'l Publication No. WO 2008/140623A1 published Nov. 20, 2008 (all said applications incorporated fully herein for all purposes).

There is a need for improved nanotube metallization processes that do not require complex apparatus or processes, produce relatively little residue for disposal, are efficient, selective, reasonably fast, and are scalable to large industrial scale production. The present invention recognizes these needs and provides solutions to these problems.

SUMMARY OF THE PRESENT INVENTION

The present invention discloses, in certain aspects, metallized nanomaterials, e.g. treated nanotubes produced by methods in which the nanotubes are subjected to microwaves to facilitate the application of metal to the nanotubes.

The present invention discloses, in certain aspects, methods for metallizing nanomaterials (e.g. nanotubes, graphene sheets, and graphene ribbon-like material) by subjecting the material to microwave radiation, thereby heating the material so that metal is deposited or electrochemically reduced thereby facilitating the deposition of metal and remains thereon.

In certain aspects, the present invention discloses methods for metallizing carbon nantoubes that includes irradiating the nanotubes in an aqueous solution with microwaves to locally heat the nanotubes using, but not limited to, metals including Pt, Pd, Sn, Au, Ag, Cu, Ni, Co, Fe, tin and combinations of these metal species.

In certain aspects, methods according to the present invention are readily scalable to mass production of metallized nanotubes (which, in one aspect, are carbon nanotubes).

Accordingly, the present invention includes features and advantages which are believed to enable it to advance metallized nanomaterial technology. Characteristics and advantages of the present invention described above and additional features and benefits will be readily apparent to those skilled in the art upon consideration of the following description of preferred embodiments and referring to the accompanying drawings.

Certain embodiments of this invention are not limited to any particular individual feature disclosed here, but include combinations of them distinguished from the prior art in their structures, functions, and/or results achieved. Features of the invention have been broadly described so that the detailed descriptions of embodiments preferred at the time of filing for this patent that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

What follows are some of, but not all, the objects of this invention. In addition to the specific objects stated below for at least certain embodiments of the invention, other objects and purposes will be readily apparent to one of skill in this art who has the benefit of this invention's teachings and disclosures. It is, therefore, an object of at least certain embodiments of the present invention to provide the embodiments and aspects listed above and:

New, useful, unique, efficient and nonobvious metallized nanomaterial and methods for producing it; and Such methods for making metallized carbon nanomaterial, e.g. metallized carbon nanotubes, graphene sheets and graphene nano-ribbon-like material ("ribbons").

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, various purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later attempt to disguise it by variations in form, changes, or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly, from a cursory inspection or review. the nature and general area of the disclosure of this invention. The Abstract is neither intended to define the invention, which is done by the claims, nor is it intended to be limiting of the scope of the invention or of the claims in any way.

It will be understood that the various embodiments of the present invention may include one, some, or all of the disclosed, described, and/or enumerated improvements and/or technical advantages and/or elements in claims to this invention.

Certain aspects, certain embodiments, and certain preferable features of the invention are set out herein. Any combination of aspects or features shown in any aspect or embodiment can be used except where such aspects or features are mutually exclusive.

BRIEF DESCRIPTION OF THE SEVERAL VIEWS OF THE DRAWINGS

A more particular description of embodiments of the invention briefly summarized above may be had by references to the embodiments which are shown in the drawings which form a part of this specification. These drawings illustrate embodiments preferred at the time of filing for this patent and are not to be used to improperly limit the scope of the invention which may have other equally effective or legally equivalent embodiments.

FIG. 8A is a scanning electron micrograph of nanotubes with copper deposited thereon.

FIG. 8B is an enlargement of part of the micrograph of FIG. 8A.

FIG. 8C is an enlargement of part of the micrograph of FIG. 8B.

FIG. 10A is a scanning electron micrograph of nanotubes with copper deposited thereon.

FIG. 10B is a scanning electron micrograph nanotubes with copper deposited thereon.

FIG. 10C is a table with EDS data about the composition of materials in FIGS. 10A and 10B.

FIG. 11A is a scanning electron micrograph of nanotubes with nickel deposited thereon.

FIG. 11B is a scanning electron micrograph of nanotubes with nickel deposited thereon.

FIG. 11C is a scanning electron micrograph of nanotubes with nickel deposited thereon.

FIG. 11D is a table with EDS composition data about the composition of materials in FIGS. 11B and 11C.

FIG. 13 presents electrical resistivity data for nanotubes with Ni deposited thereon, according to the present invention, in a polymer matrix.

Figure 1:
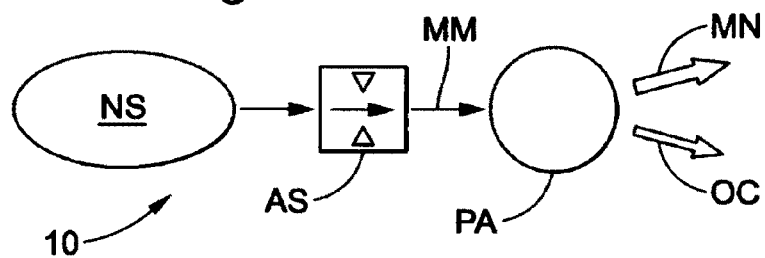
FIG. 1 is a schematic process flow diagram of a method and system according to the present invention.

Certain embodiments of the invention are shown in the above-identified figures and described in detail below. Various aspects and features of embodiments of the invention are described below and some are set out in the dependent claims. Any combination of aspects and/or features described below or shown in the dependent claims can be used except where such aspects and/or features are mutually exclusive. It should be understood that the appended drawings and description herein are of certain embodiments and are not intended to limit the invention or the appended claims. On the contrary, the intention is to cover all modifications, equivalents and alternatives falling within the spirit and scope of the invention as defined by the appended claims. In showing and describing these embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiments, and are not intended to mean the claimed invention of any particular appended claim(s) or all of the appended claims. Accordingly, the subject or topic of each such reference is not automatically or necessarily part of, or required by, any particular claim(s) merely because of such reference. So long as they are not mutually exclusive or contradictory any aspect or feature or combination of aspects or features of any embodiment disclosed herein may be used in any other embodiment disclosed herein. The drawing figures present the embodiments preferred at the time of filing for this patent.

DETAILED DESCRIPTION OF THE INVENTION

Referring to FIG. 1 in a system 10 according to the present invention, nanotubes NS in a metallizing solution are introduced to an apparatus AS in which the nanotubes are subjected to microwave radiation producing metallized nanotubes MN in a solution MM (e.g., ionic surfactant and aqueous metal salt). The resulting mixture MM is introduced to processing apparatus PA which separates metallized nanotubes MN from other components OC of the mixture MM.

Figure 2:
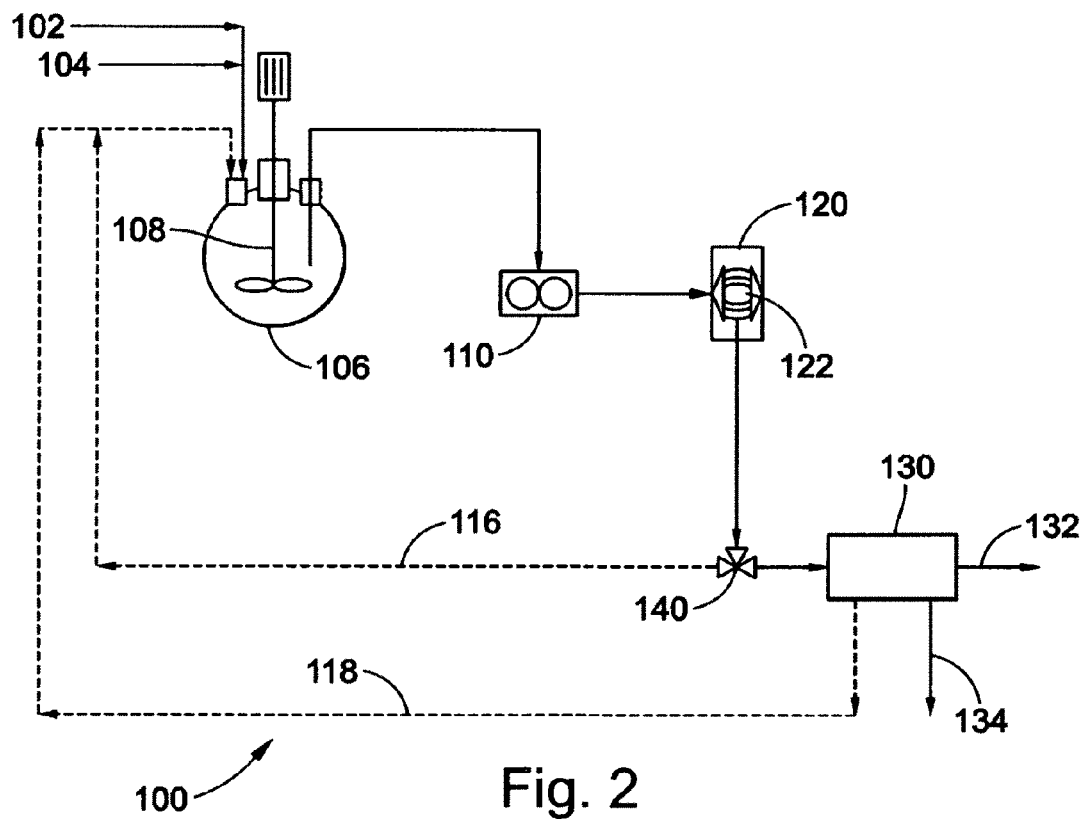
FIG. 2 is a schematic process flow diagram of a method and system according to the present invention.

FIG. 2 illustrates a system 100 according to the present invention for effecting a nanotube metallization process according to the present invention. Nanotubes 102 are introduced with a metallizing solution 104 into a vessel 106 and are mixed together with a mixer 108 under high-intensity sonication to form a suspension. In one aspect, a metal-salt/solvent/surfactant aqueous solution is used, the surfactant forming a micellular structure about individual nanotubes or about bundles of nanotubes.

A pump 110 pumps the suspension to a reactor 120 which provides a microwave field 122 for irradiating the solution (and the nanotubes therein) with microwave radiation. Metallizing material, in the solution deposits on the nanotubes following thermal excitation of the nanotubes by the microwave radiation.

A resulting suspension 128 containing metallized nanotubes is fed to a separation stage 130 (via a valve 140). The separation stage 130 produces a stream 132 of metallized nanotubes and a stream 134 of the remaining components of the suspension 128. Optionally, with the valve 140 in correct position, the suspension 128 (or part of it) is fed back to the vessel 106 for re-processing in a line 116. Optionally, the components of the suspension 128 (or some of them) other than the metallized nanotubes in the stream 132, are fed back to the vessel 106 in a line 118 for use in the process.

Figure 3:
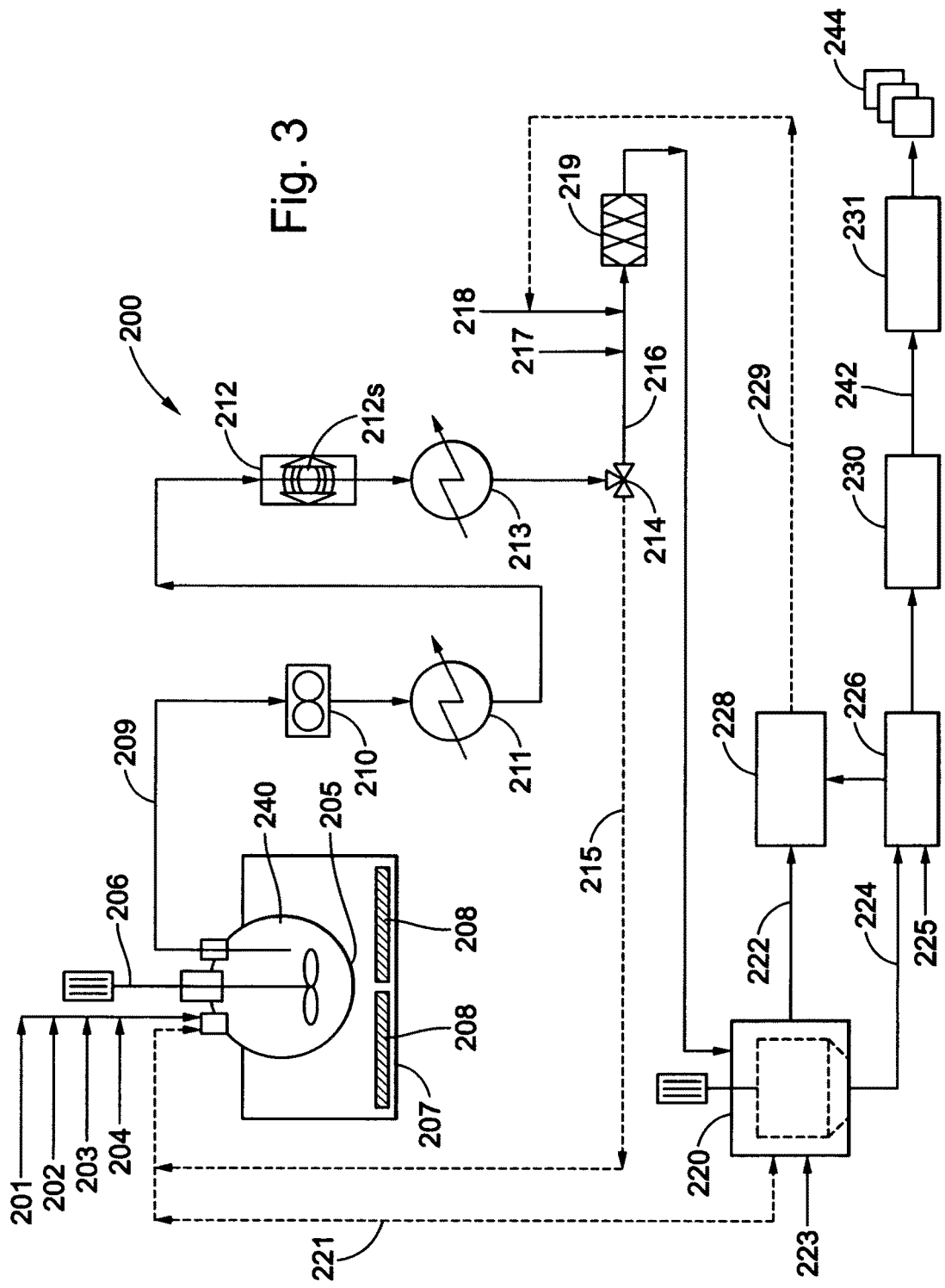
FIG. 3 is a schematic process flow diagram of a method and system according to the present invention.

FIG. 3 illustrates a system 200 according to the present invention for metallizing nanotubes. The system 200 may be used to metallize any known carbon nanotube, graphene sheet or graphene ribbon-like material, "ribbons"—all referred to as carbon nanomaterial. It can also be used to metallize non-carbon nanotubes, e.g., but not limited to, those with a high-aspect ratio so that a high dipole moment is induced and e.g. those which are at least slightly electrically conductive.

A volume 201 of distilled and de-ionized water (DDIW) plus a surfactant is charged to a glass vessel 205 equipped with an agitator 206 and mounted in a tank 207 filled with acoustic transfer medium 240, such as water. Carbon nanotubes (CNT's) 202, which may be, e.g., single-wall, double-wall, multi-wall, functionalized, or un-functionalized, are charged into the glass vessel 205 and mixed into the aqueous surfactant solution. Acoustic transducers 208 are switched on to provide cavitation mixing by sonication. High-energy sonication facilitates the separation of agglomerated CNT's and enables the formation of dispersed micelles of individual nanotubes, or small clusters thereof.

An aqueous reagent solution 203, prepared separately, is charged into the glass vessel 205 containing the mixing batch of CNT's dispersed as micelles in the surfactant solution. The reagent solution 203 contains a metal salt, or combination of metal salts, that are soluble or partially soluble in an aqueous system. The identity of the metal species in the salt or salts is the same as the metal to be reacted onto the surface of the CNT's or CNT clusters. Various additives 204 are, optionally, charged into the mixing aqueous suspension to aid nanotube dispersion, scavenge oxygen, adjust pH, and/or modify viscosity.

After a suitable time for CNT dispersion and micelle formation (e.g. one hour to twenty-four hours depending on sonication intensity and total energy required), the CNT suspension is pumped from the glass vessel 205 through a line 209, e.g. an inert polymer conduit, or polymer-lined steel conduit, by a positive displacement pump 210. Heat of both mixing and sonication is removed by a heat exchanger 211. The CNT suspension then passes to and through a continuous, tubular reactor 212 consisting of a non-metallic fluid conduit, of prescribed length and diameter, that is exposed to microwaves from a microwave source 212s. The residence time of the CNT suspension in the microwave field from the source 212s is controlled to provide adequate activation energy for depositing ionic metal onto the surface of CNT's while preventing the fluid from boiling. Microwaves are absorbed by the electrically conductive CNT's and a weak electric field is induced around each individual CNT or CNT cluster. Electrons from the surfactant shell around the CNT's are promoted over an energy barrier and onto the CNT or CNT cluster. These electrons then react with the cationic metal in the suspension, provided that the oxidation-reduction potential of the aqueous cationic metal is compatible with the negative charge induced by the weak electric field. CNT's exiting the microwave reactor 212 are "M-CNT's"—they are partially or completely coated with reduced, non-ionic metal.

The heat imparted by the reactor 212 and generated by the oxidation-reduction reaction is removed by a second heat exchanger 213. At this point, the M-CNT suspension which has passed through the heat exchanger 213 can be directed through a recycle line 215 back to the vessel 205, or through a line 216 to the isolation steps of the process. Use of a three-way valve 214 at this point is one example device that could be employed to control flow and separate the metal deposition steps from the CNT isolation steps. Any suitable flow-control/flow-directing device or apparatus may be used. Multiple passes through the reactor 212 incrementally increase the amount of metal deposition onto CNT's. This recycle loop may be operated several times until the targeted amount and morphology of metal is deposited. As the metal salt from the solution 203 and/or other chemical additives 204 are depleted in the circulating batch, they can be replenished in desired quantities at defined times to ensure steady-state process performance.

To start the isolation stage of the process, treatment chemicals 217 to aid filtration are added to the suspension upstream of a static mixer 219. The suspension is then passed through a filtration device, such as a centrifuge 220, equipped with a filter medium having a pore size suitable to remove M-CNT's (metallized carbon nanotubes). The aqueous filtrate may either be directed in a line 221 to recycle back through the process or purged to remove any accumulated impurities. After an M-CNT wet cake is trapped in the filtration device 220, it can be washed in situ to remove residual metal salts and surfactant. Either aqueous or organic solvents can be charged upstream, then passed through the wet cake, and discharged through a line 222 to a solvent recovery process 228, which can include distillation, filtration, and/or purging operations. Recovered cake wash solvents are then recycled in a line 229 back to the process for future M-CNT cake washes.

After impurities are removed from the wet cake, the centrifuge 220 is run at high speed to partially dry the M-CNT cake by forcing out residual solvent. The centrifuge may be any suitable known centrifuge, including, but not limited to, an ultra-centrifuge. High-pressure dry air or nitrogen in a line 223 is, optionally, charged to the back side of the filter medium to detach the M-CNT cake from the porous filter surface. The M-CNT cake is then discharged in a line 224 to a dryer 226 (such as an oven or fluidized bed unit) into which a heated dry air or nitrogen sweep is injected in a line 225. Residual solvent is removed from the M-CNT's and passed to the solvent recovery process 228. After drying is completed, gross agglomerations of M-CNT's are broken apart in a de-lumping or milling operation 230, the product of which is a fine powder of M-CNT's. This material flows in a line 242 for division into salable lots and packaging by packaging apparatus 231, producing packages 224 of the material in appropriate containers.

In one particular embodiment, process parameters for the system 200 are:
1. CNT concentration in suspension in vessel 205: 10-1000 mg/L
2. Surfactant concentration in solution in vessel 205: 0.1-2.0 Wt. %
3. Ionic metal molar ratio of: 0.25-2.00 gmol metal/gmol C
4. Sonication power: 9-20 kW/m$^2$
5. Sonication frequency: 20-80 kHz
6. Sonication energy input: 100-1000 J/g suspension
7. Microwave frequency: in the 300 MHz-300 Ghz range, e.g, but not limited to, between 900 MHz-2.450 GHz
8. Microwave wavelength: 1 mm-1 m
9. Microwave power imparted to fluid by 212s: 3.6-12.0 kW·sec
10. CNT suspension flow rate (pumped through line 209 by pump 210 to reactor 212): 90-500 ml/min
11. Temperature rise of CNT suspension (across inlet and outlet of reactor 212): 30-95° C.
12. Oxidation-reduction potential of metal ions (in vessel 205): +1.0 V to −1.0 V In one particular embodiment of a system 200 and operation according to the present invention of the system 200:
1. A solution containing 100 mg/L of CNT and 1% by weight SDBS (sodium dodecybenzenesulfonate) is homogenized for 1 hour in the vessel 205. The solution is then sonicated in the vessel 205 using a 750 watt probe sonicator at 72% power and one-second pulse for 30-minutes, or until dispersion is achieved.
2. Copper (II) chloride dihydrate is added to the solution in the vessel 205 to make a final concentration of 0.01 gmol/L.
3. The solution is then pumped to and through a reactor 212 and a section of non-metallic tubing in a 1,200 watt microwave using full power at a rate of 210 mL/minute.
4. The nanotubes are then recovered via filtration (e.g. with centrifuge 220, FIG. 3) using a 0.8 micron pore size silver filter. They are then dispersed into distilled water via sonication. The solution is then homogenized once more to remove excess surfactant and filtered once more on a silver filter. The tubes are then removed from the filter by sonication in acetone which is then evaporated to leave dry metallized nanotubes.

In one particular embodiment of a system 200 and operation according to the present invention of the system 200:
1. A suspension containing 100 mg/L of CNT and 2% by weight SDBS in 30 L of DDIW is mixed at 1500 rpm in the vessel 205 and simultaneously sonicated to a total input energy of 150 J/g of suspension.
2. Copper (II) chloride dihydrate is charged to the suspension in the vessel 205 to achieve a molar ratio of 1 gmol Cu per 1 gmol C.
3. The CNT suspension is then pumped through inert polymer tubing via a gear pump (e.g. pump 210) at a rate of 200 mL/min. The CNT solution then passes through the heat exchanger 211 where it is cooled to 10° C.
4. After passing through the heat exchanger 211, the CNT suspension passes through the reactor 212 operating at 1200 W and 2450 MHz where an oxidation-reduction reaction occurs to deposit non-ionic copper metal onto the surface of the CNT's, thereby forming M-CNT's. During this process, the fluid heats to 90° C.
5. The flowing M-CNT suspension then passes through the heat exchanger 213 to remove the heat imparted by the reactor. After cooling, the M-CNT suspension is passed back through the process two additional times (e.g. flow through valve 214 and line 215 back to vessel 205; with valve 214 then switched back for flow to line 216) to increase the amount of metal deposition.
6. After additional passes through the reactor 212, aqueous sodium hydroxide is added to adjust the pH and aid filtration. The M-CNT's are then filtered by the centrifuge 220 equipped with a 0.8 μm pore size filter medium. Multiple centrifuge passes are made to maximize M-CNT capture efficiency, herein cited to be 65% for two passes.
7. The trapped M-CNT's are then washed in place using DDIW, and spun at high speed by the centrifuge 220 to disengage the cake wash along with substantial surfactant and residual metal salt. The final wet cake contains 88 wt. % moisture.
8. Wet M-CNT's were then sent to the dryer 226 and dried under vacuum and then a thermogravimetric analysis (TGA) was performed. Results indicated that 45.7 wt. % Cu is deposited on the CNT's after three reactor passes. Two passes deposits 42.1 wt. % Cu, whereas a single pass deposits 23.6 wt. % Cu. Scanning electric microscopy (SEM) showed that Cu is deposited in irregular clusters on the surface of the CNT's rather than as a uniform coating of consistent thickness.

Any method and system according to the present invention may be used to deposit metal particles (e.g. typically between one and five nanometers thick) or metal coating (e.g. between one and five nanometers thick) onto nanotubes, graphene sheets, or graphene ribbons.

In systems and methods according to the present invention, the mechanism for metallization relies primarily on the electrical conductivity of nanotubes, nanoribbons, and graphene sheets. Because of this intrinsic property, nanoparticles function as tiny microwave antennae that absorb microwave energy and convert it into an electrical dipolar charge on the particles thereby enabling an oxidation-reduction reaction to deposit metal. Because different CNT chiralities have differing electrical conductivity, more metal can be deposited on some CNT types than on others.

A metallization process according to the present invention can, therefore, be used in a separation process to segregate CNT's by type and/or chirality. For example, density gradient centrifugation after microwave metallization is used to separate denser CNT's bonded to more metal from less dense CNT's containing less reduced (deposited) metal. Metallic chiralities can to a certain extent be separated from semiconducting chiralities by using such a method. In such methods the centrifuge 220 is suitable to effect this density gradient centrifugation.

Figure 4A:
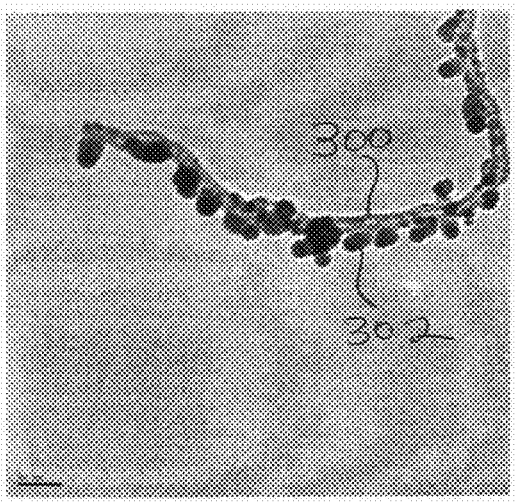
FIG. 4A is a transmission electron micrograph view of a nanotube with metal deposits.

FIG. 4A shows a single-walled carbon nanotube 300 with silver particles 302 deposited thereon by a method according to the present invention as in FIG. 3.

Figure 4B:
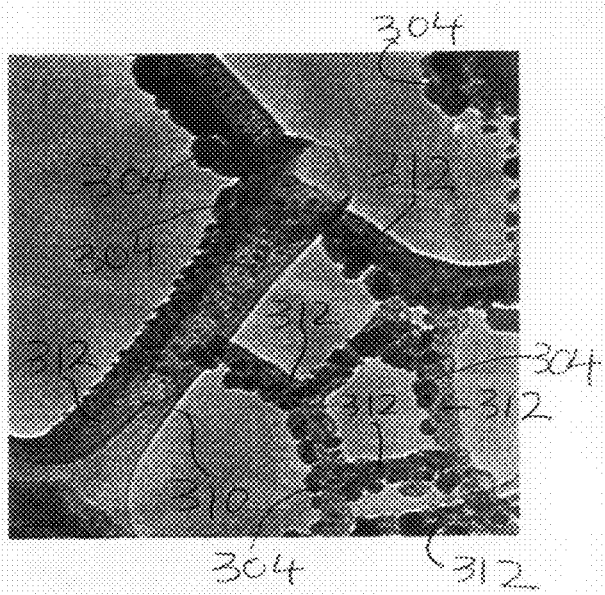
FIG. 4B is a transmission electron micrograph view of a nanotube network with metal deposits.

FIG. 4B shows a network 310 of carbon nanotubes 312 with silver particles 304 deposited thereon.

Figure 5A:
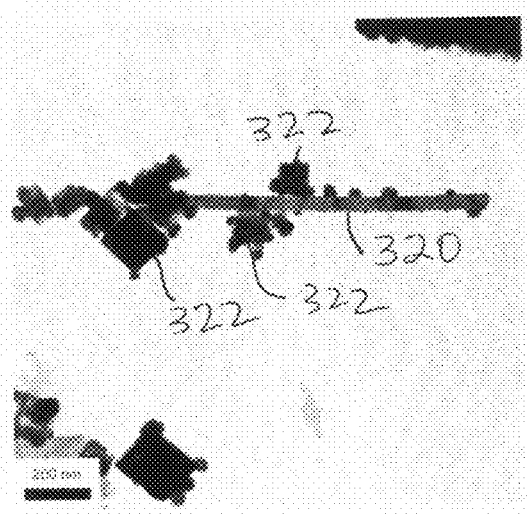
FIG. 5A is a transmission electron micrograph view of a nanotube with metal deposits.
Figure 5B:
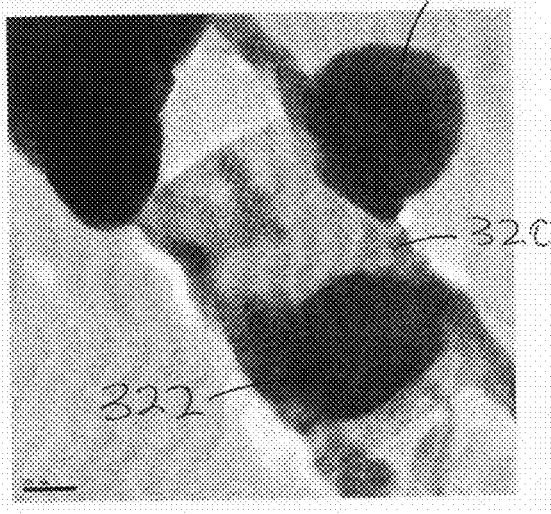
FIG. 5B is an enlargement of part of the view of FIG. 5A.

FIGS. 5A and 5B show a single-walled carbon nanotube 320 with cubic crystals 322 of silver deposited thereon by a method according to the present invention as in FIG. 3.

Nanotubes like the nanotubes 302 and 320 with metal deposited thereon are denser than nanotubes with no metal deposit. The denser nanotubes with metal deposited thereon can be separated from those with no metal based on this difference in density. In one aspect, a density gradient centrifuge used in a method according to the present invention effects this separation.

Figure 6A:
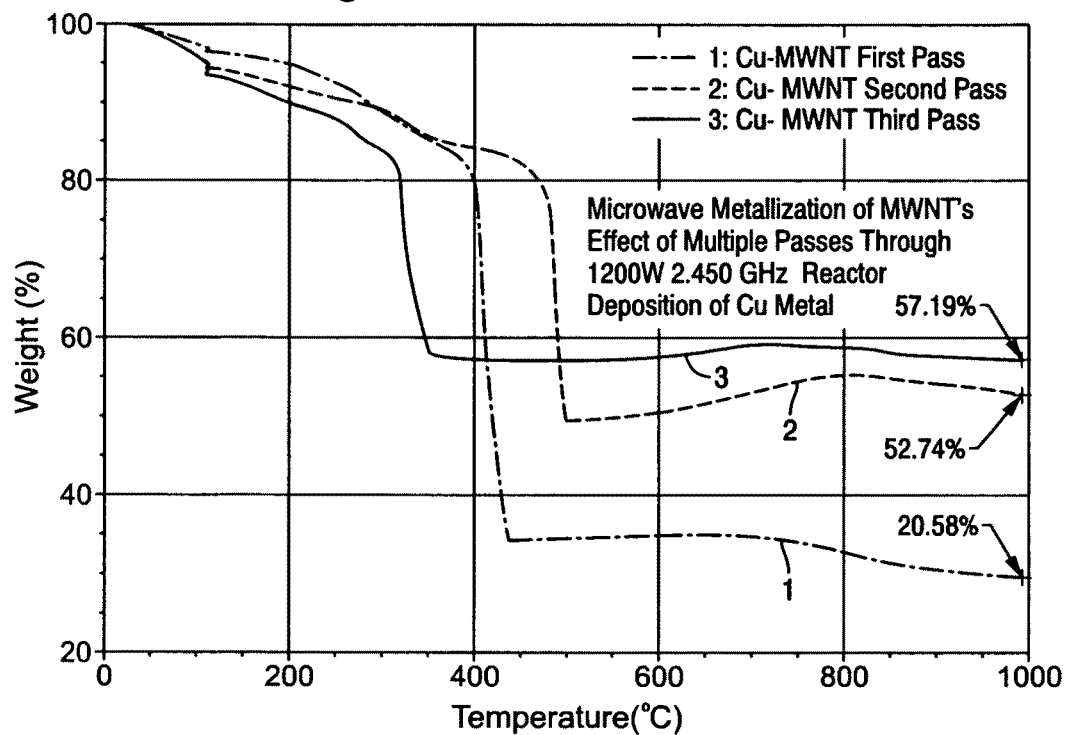
FIG. 6A is a graph of thermogravimetric analysis data for an analysis of amounts of metal deposition by a metallization process according to the present invention.

FIG. 6A presents data in graphic form that shows that using multiple recycling passes through a process according to the present invention (e.g. as in FIG. 3) increases the amount of metal deposited on the target material. The data presented in the graph is from a post-metallization analysis of samples produced by a metallization process according to the present invention using a thermal gravimetric analysis (TGA) of the samples. The horizontal axis of the graph is the temperature in degrees C. used in the TGA analysis in which carbon is burned away to reveal the amount of remaining metal residue and the vertical axis is weight percent of oxidized deposited metal on the nanotubes. The deposited metal in this case was copper. The weight percents indicated on the graph of FIG. 6A (29.6% first pass, 52.7% second pass, 57.2% third pass) are based on the weight of copper oxide which is produced when the deposited copper is oxidized by the TGA analysis heating. The illustrated copper oxide weight percents are multiplied by 0.799 to obtain the weight percent of deposited copper. The 29.6% first pass weight percent corresponds to 23.6% deposited copper; the 52.7% second pass weight percent corresponds to 42.1% deposited copper; and the 57.2% third pass weight percent corresponds to 45.7% deposited copper.

As shown in FIG. 6A, the incremental amount of metal deposited in a second pass through the process is greater than the incremental amount deposited in a third pass.

Figure 6B:
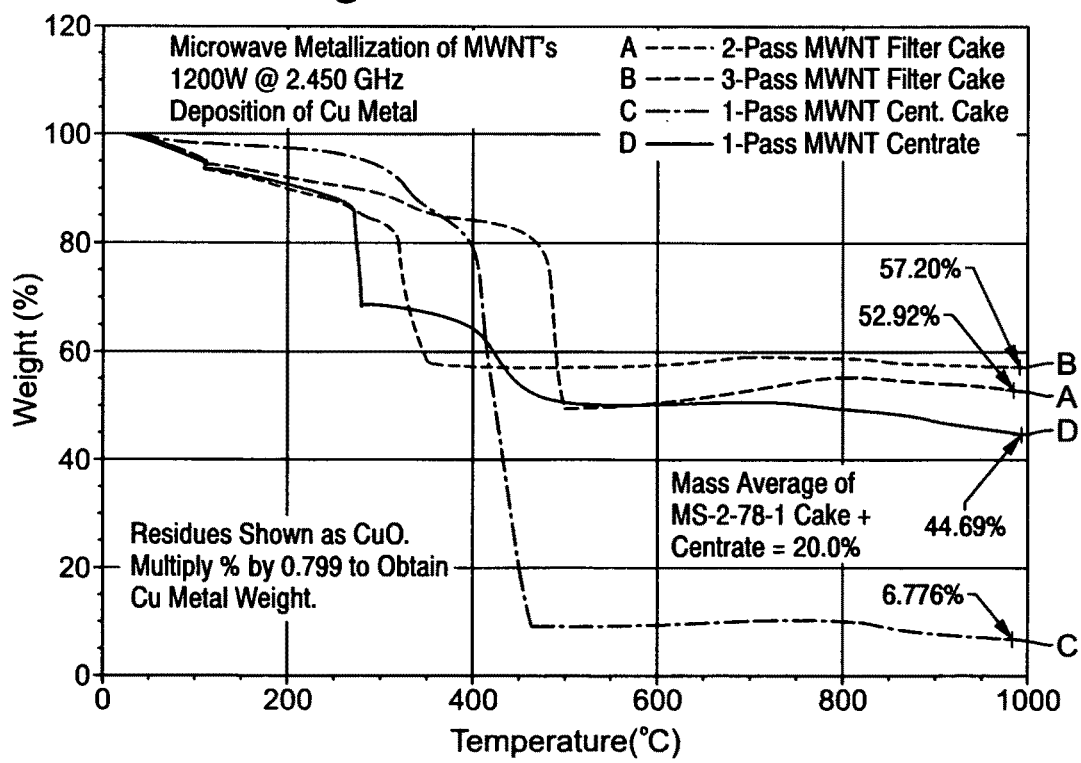
FIG. 6B is a graph of thermogravimetric analysis data for an analysis of amounts of metal deposition by a metallization process according to the present invention.

FIG. 6B illustrates the metallization of multi-walled nanotubes using a process as in FIG. 3. For the case illustrated in FIG. 6B, the deposited metal was copper and the material was multi-walled carbon nanotubes. The metal was deposited using a process as in FIG. 3 at an energy level of 1200 Watts and a microwave frequency of 2.450 Ghz. FIG. 6B presents data in graphic form related to multiple passes of a suspension with metallized material therein through a filtration device for material recovery (e.g., the centrifuge 220, FIG. 3) to increase the recovery of metallized material. Line A illustrates the recovery rate for two passes through the device. Line B illustrates the increased recovery rate for three passes through the device. Lines C and D illustrate the split between recovered material (Line C) and separated material forwarded for reprocessing (Line D) after a single centrifuge pass.

Figure 7:
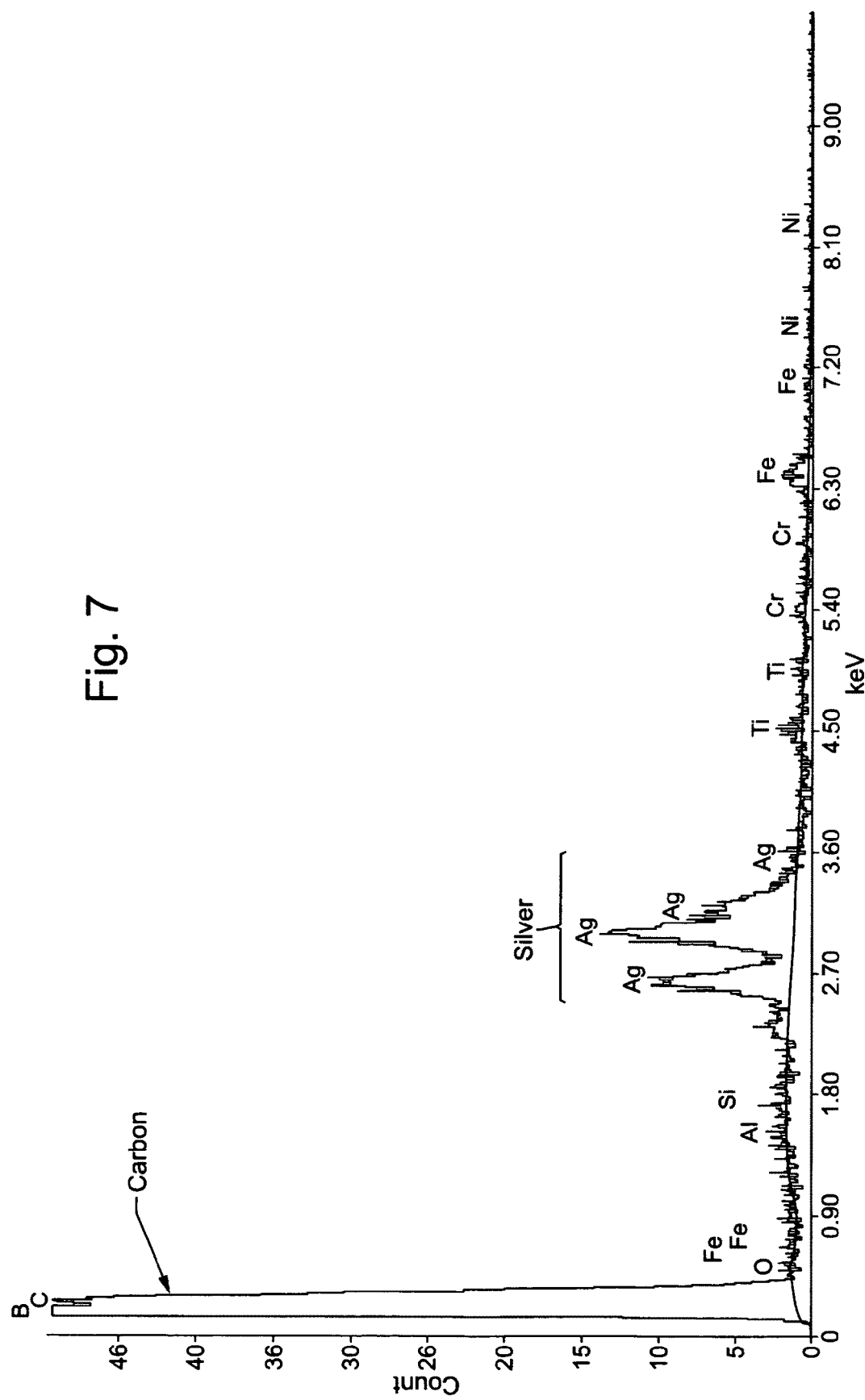
FIG. 7 presents an atomic EDS (energy dispersive X-ray spectroscopy) analysis of metal-CNT composition.
Figures 9A, 9B, 9C:
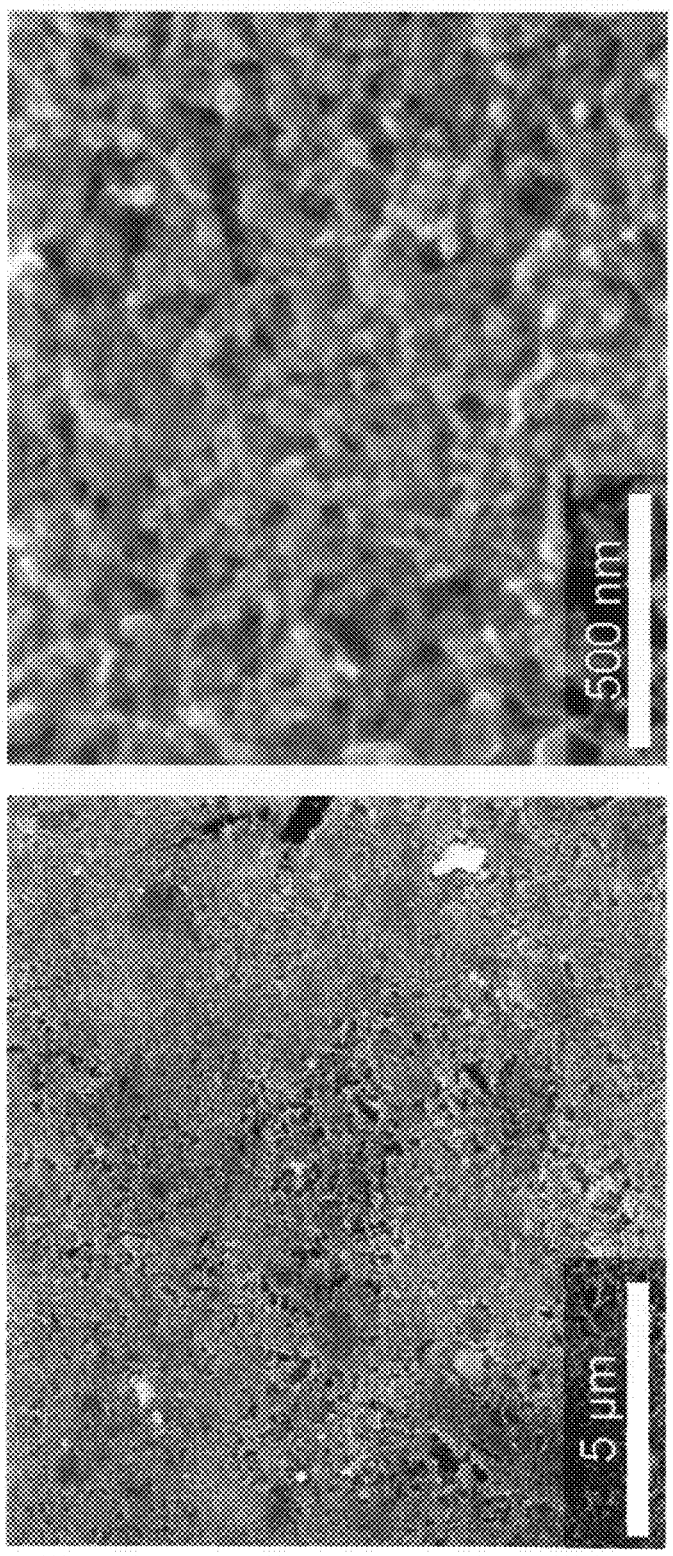
FIG. 9A is a scanning electron micrograph of nanotubes with copper deposited thereon.
FIG. 9B is a scanning electron micrograph nanotubes with copper deposited thereon.
FIG. 9C is a table with EDS data about the materials in FIGS. 9A and 9B.

FIG. 7 presents in graphic form data illustrating that silver is deposited using a process as in FIG. 3 with results as shown in FIGS. 4A-5B. The large peak to the left indicates the amount of carbon (nanotubes) present. In FIG. 7, the vertical axis indicates EDS detection intensity, the number of counts or the intensity of the signal for a specific element and the horizontal axis indicates which elements are present (electron orbitals of specific elements).

FIGS. 8A-12C illustrate the deposition of various metals on nanotubes.

FIGS. 8A-8C show the deposition of copper onto multi-walled carbon nanotubes by a process as in FIG. 3. In the figures, copper (and some copper II oxide formed during metallization or produced by oxidation post-processing) appear as white areas on the surfaces of the nanotubes. The nanotubes shown have a mean diameter of 13 nanometers prior to the metallization process according to the present invention.

FIGS. 9A and 9B, and FIGS. 10A and 10B, also show the depositon of copper onto multi-walled carbon nanotubes. FIG. 9C presents EDS data for each of FIGS. 9A and 9B and shows that copper was deposited on the nanotubes ("Wt %" is the percent of each element present in the sample; "At %" is a similar analysis using as a basis the atomic percent).

FIGS. 11A-11C show the deposition of nickel onto multi-walled carbon nanotubes by a process as in FIG. 3. FIG. 11D presents EDS data for each of FIGS. 11B and 11C and shows that nickel was deposited on the nanotubes.

Figures 12A, 12B, 12C, 12D:
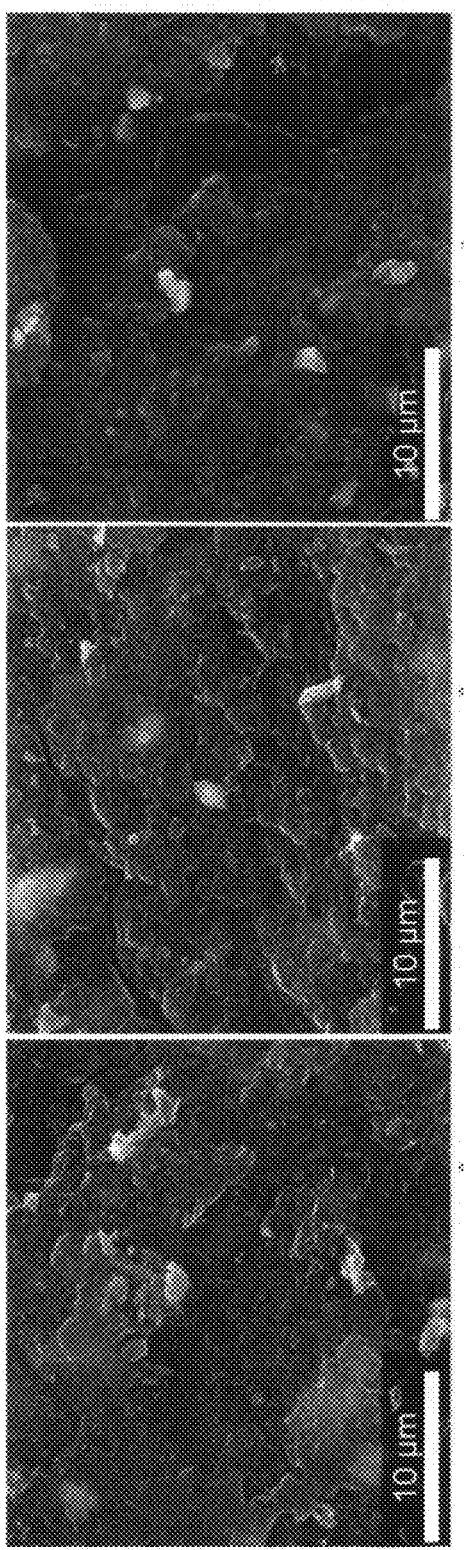
FIG. 12A is a scanning electron micrograph of nanotubes with cobalt deposited thereon.
FIG. 12B is a scanning electron micrograph nanotubes with cobalt deposited thereon.
FIG. 12C is a scanning electron micrograph of nanotubes with cobalt deposited thereon.
FIG. 12D is a table with EDS composition data about the composition of materials in FIGS. 12A, 12B and 12C.

FIGS. 12A-12C show the deposition of cobalt onto multi-walled carbon nanotubes by a process as in FIG. 3. FIG. 11D presents EDS data for each of FIGS. 12A-12C and shows that cobalt was deposited on the nanotubes.

FIG. 13 presents electrical resistivity data for multi-walled carbon nanotubes with nickel deposited thereon using a process as in FIG. 3. In this particular aspect, the nanotubes contained 16 weight percent deposited nickel metal. For these data:

"Resistivity Mean ($\Omega \cdot cm$)" is the mean average resistivity of the samples measured.

"Resistivity St. Dev (+1–$\Omega \cdot cm$)" is the standard deviation around the mean average resistivity of the samples measured. The nanotubes were contained in a polyurethane-methacrylate matrix at the weight percentages indicated in the left column of the table. The "100.0" entry indicates the data for nickel-metallized nanotubes not in a polyurethane-methacrylate matrix, but rather compacted as a solid into a cylindrical mold. For reference, the resistivity of compacted nanotubes without deposited nickel metal was 1.41E-01$\Omega$ cm. These data indicate an increase in electrical resistivity as the amount of metallized nanotubes is increased in the polymer matrix.

The present invention, therefore, provides in some, but not in necessarily all embodiments a process for metallizing nanomaterial comprising subjecting nanomaterial in a metallizing solution to microwave radiation. In such a process the nanomaterial may be carbon nanomaterial which is one of carbon nanotubes, graphene sheets, and graphene ribbon-like material.

The present invention, therefore, provides in some, but not in necessarily all embodiments a process for metallizing nanotubes including forming a first solution comprising carbon nanotubes and a metallizing solution; introducing the first solution into a reactor; irradiating the first solution in the reactor with microwave radiation so that metal from the metallizing solution is deposited on the nanotubes, producing a suspension with metallized nanotubes; feeding the suspension to separation apparatus; and, with the separation apparatus, separating metallized nanotubes from the suspension. Such a process may have one or some, or any possible combination, of the following: wherein the nanotubes are carbon nanotubes; wherein the metallizing solution contains a metal salt of the metal to be deposited on nanotubes, solvent, surfactant, and water; mixing the first solution with a mixer under sonication to separate nanotubes; removing heat generated by the mixing of the first solution with a heat exchanger; removing heat from the suspension; at least once feeding part of the suspension separated by the separating apparatus back to the reactor for re-processing to recover further metallized nanotubes; the at least once feeding is a plurality of feedings; feeding metallized nanotubes separated by the separation apparatus to a dryer, and with the dryer, drying the metallized nanotubes; feeding a heated stream to the dryer to facilitate drying; wherein the first solution contains solvent, the process further including separating solvent from the suspension with the separation apparatus; recovering, with a solvent recovery apparatus, solvent separated by the separation apparatus; packaging the metallized nanotubes separated from the suspension; adding a basic solution to the suspension to facilitate separation of metallized nanotubes; wherein the metal is one of (or a combination of any two, three or four of) gold, silver, copper, nickel, cobalt, iron, tin, palladium, and platinum; and/or wherein the nanotubes are carbon nanotubes which are one of single-walled nanotubes, double-walled nanotubes, multi-walled nanotubes, functionalized nanotubes, un-functionalized nanotubes, or any combination of any two, three, or more of these types of nanotubes.

The present invention, therefore, provides in some, but not in necessarily all embodiments a process for metallizing nanotubes including forming a first solution including carbon nanotubes and a metallizing solution; introducing the first solution into a reactor; irradiating the first solution in the reactor with microwave radiation so that metal from the metallizing solution is deposited on the nanotubes, producing a suspension with metallized nanotubes; feeding the suspension to separation apparatus; with the separation apparatus, separating metallized nanotubes from the suspension; wherein the nanotubes are carbon nanotubes; wherein the metallizing solution contains a metal salt of the metal to be deposited on nanotubes, solvent, surfactant, and water; mixing the first solution with a mixer under sonication to separate nanotubes; removing heat generated by the mixing of the first solution with a heat exchanger; removing heat from the suspension; at least once (or multiple times) feeding part of the suspension separated by the separating apparatus back to the reactor for re-processing to recover further metallized nanotubes; feeding metallized nanotubes separated by the separation apparatus to a dryer; and with the dryer, drying the metallized nanotubes.

The present invention, therefore, provides in some, but not in necessarily all embodiments a metallized nanomaterial, e.g., but not limited to, metallized carbon nanotubes, metallized by a process according to the present invention, e.g. as in any claim herein.

The present invention, therefore, provides in some, but not in necessarily all embodiments a method for separating nanotubes of different densities, the method including: introducing a mixture of first nanotubes and second nanotubes into a separation apparatus, the separation apparatus useful for separating materials of different densities; the first nanotubes being metallized nanotubes and having a first density, the second nanotubes having a second density different from the first density; and with the separation apparatus, separating the first nanotubes from the second nanotubes. Such a method may have one or some, or any possible combination, of the following: wherein the separation apparatus is a centrifuge, e.g., but not limited to, an ultra-centrifuge; wherein the first nanotubes have a metallic chirality and the second nanotubes have a semiconducting chirality; wherein the first nanotubes have metal bonded thereto by a metallizing process as any process according to the present invention, e.g., but not limited to, as in claim 1; wherein the first nanotubes have metal bonded thereto by a metallizing process as any process according to the present invention, e.g., but not limited to, as in claim 1 and the second nanotubes have metal bonded thereto by a metallizing process as any process according to the present invention, e.g., but not limited tog as in claim 1; wherein the first nanotubes are single-walled nanotubes and the second nanotubes are multi-walled nanotubes; wherein the first nanotubes are functionalized and the second nanotubes are non-functionalized; wherein the first nanotubes are functionalized and the second nanotubes are functionalized; and wherein the first nanotubes are carbon nanotubes.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with the requirements of 35 U.S.C. §112. The inventors may rely on the Doctrine of Equivalents to determine and assess the scope of their invention and of the claims that follow as they may pertain to apparatus and/or methods not materially departing from, but outside of, the literal scope of the invention as set forth in the following claims. All patents and applications identified herein are incorporated fully herein for all purposes. It is the express intention of the applicant not to invoke 35 U.S.C. §112, paragraph 6 for any limitations of any of the claims herein, except for those in which the claim expressly uses the words 'means for' together with an associated function. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

Filed on even date herewith, co-owned with the present invention, and fully incorporated herein for all purposes are U.S. patent applications entitled "Ceramic Articles And Methods" and "Armor With Transformed Nanotube Material".

What is claimed is:

1. A process for metallizing carbon nanotubes comprising
   forming a first solution comprising carbon nanotubes, and a metallizing solution,
   introducing the first solution into a reactor,
   irradiating the first solution in the reactor with microwave radiation so that the carbon nanotubes are thermally excited by the microwave radiation and metal from the metallizing solution is deposited on the carbon nanotubes producing metallized carbon nanotubes,
   producing a suspension with the metallized carbon nanotubes, and feeding the suspension to separation apparatus and,
   with the separation apparatus, separating metallized carbon nanotubes from the suspension.

2. The process of claim 1 wherein the metallizing solution contains a metal salt of the metal to be deposited on the nanotubes, solvent, surfactant, and water.

3. The process of claim 1 further comprising mixing the first solution with a mixer under sonication to separate carbon nanotubes.

4. The process of claim 1 further comprising removing heat generated by the mixing of the first solution with a heat exchanger.

5. The process of claim 1 further comprising removing heat from the suspension.

6. The process of claim 1 further comprising at least once feeding part of the suspension separated by the separating apparatus back to the reactor for re-processing to recover further metallized carbon nanotubes.

7. The process of claim 6 further comprising the at least once feeding is a plurality of feedings.

8. The process of claim 1 further comprising feeding metallized carbon nanotubes separated by the separation apparatus to a dryer, and with the dryer, drying the metallized carbon nanotubes.

9. The process of claim 8 further comprising feeding a heated stream to the dryer to facilitate drying.

10. The process of claim 1 wherein the first solution contains solvent, the process further comprising separating solvent from the suspension with the separation apparatus.

11. The process of claim 1 further comprising recovering, with a solvent recovery apparatus, solvent separated by the separation apparatus.

12. The process of claim 1 further comprising packaging the metallized carbon nanotubes separated from the suspension.

13. The process of claim 1 further comprising adding a basic solution to the suspension to facilitate separation of metallized carbon nanotubes.

14. The process of claim 1 wherein the metal is one of gold, silver, copper, nickel, cobalt, iron, tin, palladium, and platinum.

15. The process of claim 1 wherein the carbon nanotubes are one of single-walled nanotubes, double-walled nanotubes, multi-walled nanotubes, functionalized nanotubes, unfunctionalized nanotubes.

16. Metallized carbon nanotubes made by a process as in claim 1.

17. The metallized carbon nanotubes of claim 16 wherein the metal as deposited on the carbon nanotubes is between one and five nanometers thick.

18. A process for metallizing carbon nanotubes comprising forming a first solution comprising carbon nanotubes and a metallizing solution, introducing the first solution into a reactor, irradiating the first solution in the reactor with microwave radiation so that the carbon nanotubes are thermally excited and metal from the metallizing solution is deposited on the carbon nanotubes producing metallized carbon nanotubes, producing a suspension with the metallized carbon nanotubes, and feeding the suspension to separation apparatus, with the separation apparatus separating metallized carbon nanotubes from the suspension, wherein the metallizing solution contains a metal salt of the metal to be deposited on carbon nanotubes, solvent, surfactant, and water, mixing the first solution with a mixer under sonication to separate carbon nanotubes, removing heat generated by the mixing of the first solution with a heat exchanger, removing heat from the suspension, at least once feeding part of the suspension separated by the separating apparatus back to the reactor for re-processing to recover further metallized carbon nanotubes, and feeding metallized carbon nanotubes separated by the separation apparatus to a dryer, and with the dryer, drying the metallized carbon nanotubes.

* * * * *